May 11, 1965 K. FISCHER 3,183,287
METHOD AND APPARATUS FOR FORMING PARTICLE BOARD PANELS
Filed April 16, 1962 6 Sheets-Sheet 1

INVENTOR.
KURT FISCHER
BY
ATTORNEYS

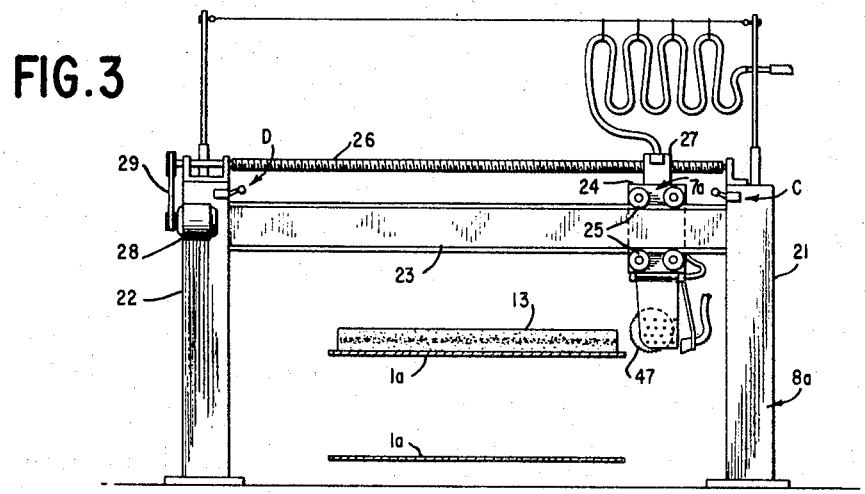
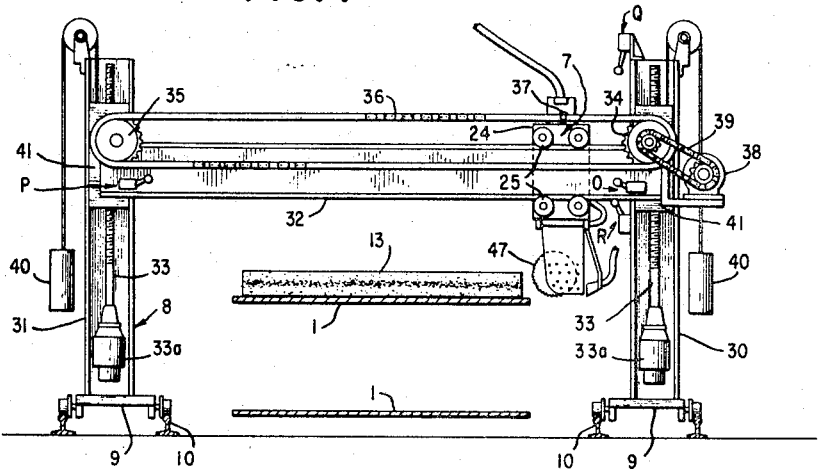
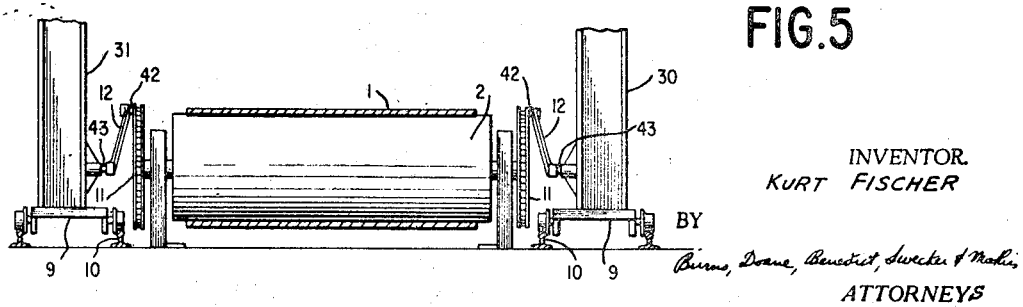

May 11, 1965   K. FISCHER   3,183,287
METHOD AND APPARATUS FOR FORMING PARTICLE BOARD PANELS
Filed April 16, 1962   6 Sheets-Sheet 3

INVENTOR.
KURT FISCHER
BY
Burns, Doane, Benedict, Swecker & Mathis
ATTORNEYS

May 11, 1965 K. FISCHER 3,183,287
METHOD AND APPARATUS FOR FORMING PARTICLE BOARD PANELS
Filed April 16, 1962 6 Sheets-Sheet 4
FIG. 9
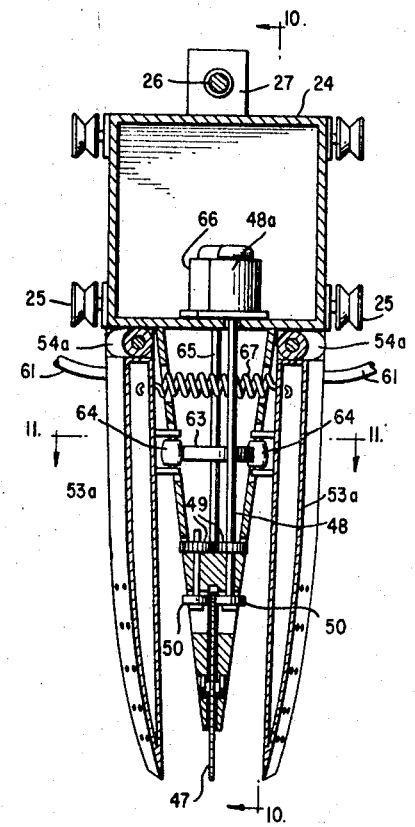
FIG. 10
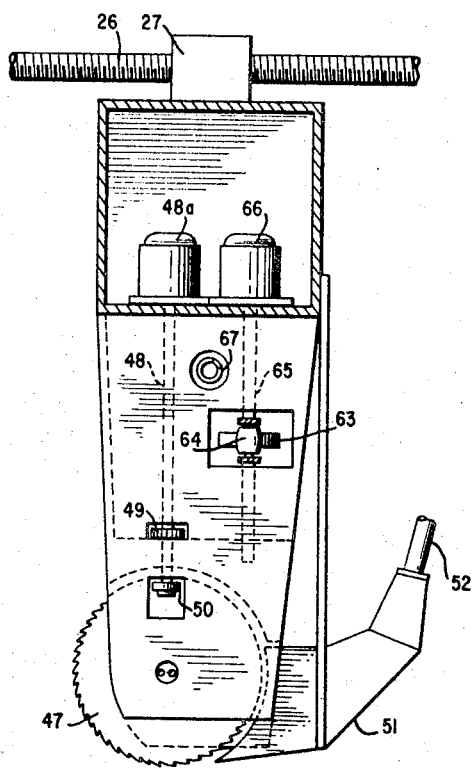
FIG. 11
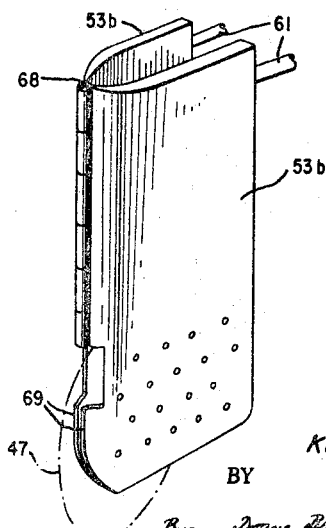
FIG. 12
INVENTOR.
KURT FISCHER
BY
ATTORNEYS United States Patent Office 3,183,287
Patented May 11, 1965

3,183,287
METHOD AND APPARATUS FOR FORMING PARTICLE BOARD PANELS
Kurt Fischer, Bad Munder, Germany, assignor to Metallwerk Bahre K.G., Springe, Hannover, Germany, a firm of Germany
Filed Apr. 16, 1962, Ser. No. 187,532
Claims priority, application Germany, Apr. 25, 1961, B 62,273
12 Claims. (Cl. 264—118)

This invention relates to improvements in process and apparatus for producing particle board panels. The particle board panels are fabricated by first laying an uncompressed mat of discrete particles on a continuous movable conveyor through the medium of a mat-laying instrumentality. Such an uncompressed mat may be as much as several inches in thickness. The mat which is laid upon or carried by the conveyor is at the time of its formation wholly uncompressed and comprised of discrete loose particles to which a binding agent has usually been applied.

In some operations the uncompressed mat of loose discrete particles is laid on cauls advanced in end-to-end relation beneath a mat-laying station. In other operations, the mat is laid directly upon a continuous movable conveyor which may carry the mat from the mat-forming station into a press for compressing the particles of the mat to form a partially or completely cured panel. In either of these operations it is essential to sever from the mat of uncompressed loose discrete particles a section thereof of predetermined length to be subsequently compressed to form a cured panel.

Difficulties have been encountered in the past due to the fact that when the mat of uncompressed loose discrete particles carried by the conveyor is severed along a line transversely of the mat, as by sawing to provide a section for subsequent pressing, the loose uncompressed discrete particles forming the walls of the channel cut by the saw have a tendency to crumble or slough off here when the caul carrying the severed mat section is moved way from the following caul or when a severed section of the mat is advanced into a press.

In some operations of the prior art it has even been found necessary to make parallel spaced apart cuts between the severed section to be subsequently pressed and the remaining mat on the conveyor with the necessity that the intervening narrow strip of mat between the transverse cuts must be discarded or returned and refed to the mat forming station.

It is the broad purpose and object of the present invention to obviate the disadvantages and difficulties of the prior practice incident to the severing from the uncompressed mat of loose discrete particles carried by the conveyor of a section of predetermined length for subsequent pressing.

In carrying out the objects and purposes of the present invention, the opposite walls of the channel cut by the saw which form the cut edges of successive mat sections are consolidated and compacted by a tamping action during the cutting operation to form suitable cut edges of the mat sections and eliminate the trickling down of particles or the breaking off of chunks of loose particles from the edges of succeeding mats.

It has been ascertained that particularly good compacting and consolidation of the particles forming the opposed walls of the channel cut in the mat by the saw can be achieved by laterally oscillatable surfaces actuated concurrently with the cutting action to tamp and consolidate the particles forming and juxtaposed to the opposed walls of the channel.

It is additionally within the purview of the invention not only to effect concurrently with the cutting of the channel transversely of the uncompressed mat of loose discrete particles a tamping and consolidation achieved through the medium of a surface oscillated transversely of the channel but also to facilitate the compacting and consolidation of the particles forming the opposed walls of the channel by the application of heat or fluid media to such particles while being subjected to the tamping action of the oscillatable surface.

The tamped, compacted and consolidated particles forming the opposed walls of the channel between a severed section of the uncompressed mat and the remaining mat carried by the conveyor form relatively stable, self-sustaining cut edges which facilitate either subsequent handling of cauls carrying mat sections to be compressed or the direct delivery of a severed mat section by the conveyor into a press.

Further and more specific purposes and objects of the invention will become apparent as the description proceeds which will be set forth in connection with the accompanying drawings, wherein FIGURE 1 is a generally diagrammatical view in side elevation of a continuously operating installation embodying the invention;

FIGURE 3 is a transverse view with parts in section along the line 3—3 of FIGURE 2 and showing a modification of the cutting means together with the tamping and consolidating means suitable for employment with the installation shown in FIGURE 2;

FIGURE 4 is a view generally along line 4—4 of FIGURE 1, with incidental parts omitted, illustrating a modified construction for the cutting means together with the tamping and consolidating means appropriate for use in the continuously operating installation shown in FIGURE 1;

FIGURE 5 is a fragmentary cross-sectional view taken on the line 5—5 of FIGURE 1;

FIGURE 9 is a vertical cross-sectional view through the modified sub-assembly shown in FIGURE 8;

FIGURE 10 is a view in elevation with the parts broken away of the sub-assembly shown in FIGURE 8 and at right angles to FIGURE 9;

FIGURE 11 is a detail view along the line 11—11 of FIGURE 9;

FIGURE 12 is a perspective view of still another embodiment of cutting means and tamping and compacting means suitable for use in the invention;

Figure 1:
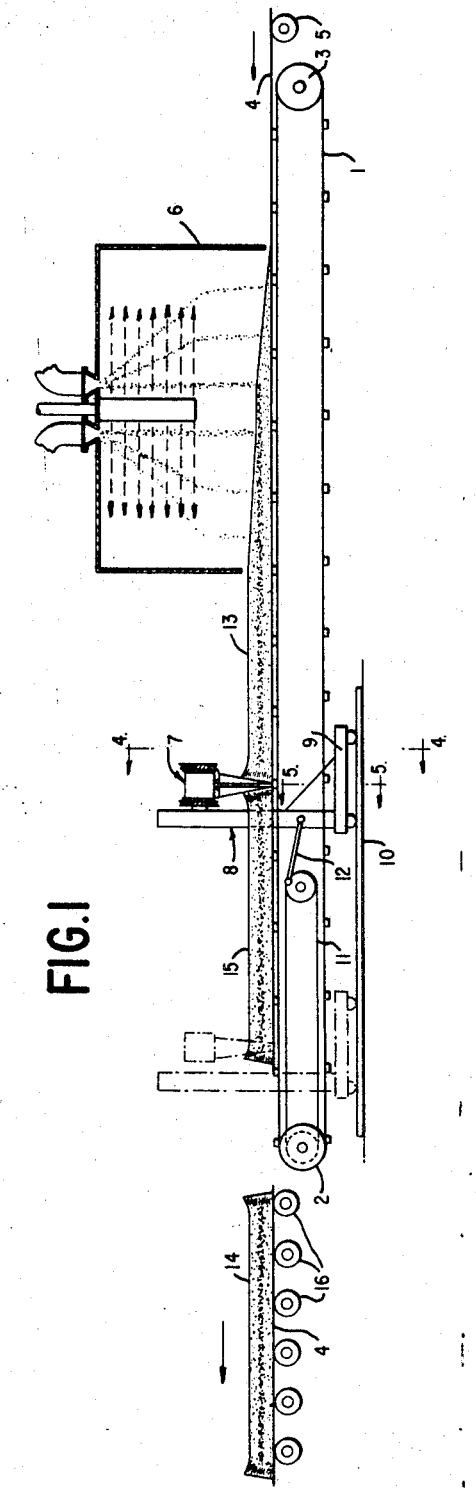

Referring to FIGURE 1, there is illustrated a continuous conveyor 1 trained about the driven drum 2 at the left-hand end and the idler drum 3 at the right-hand end. In this FIGURE 1 embodiment, the conveyor is continuously advanced and receives successive cauls 4 supplied from rollers 5. The cauls 4 carried on the conveyor 1 are advanced beneath the mat-forming station 6 which in FIGURE 1 embodiment is stationary. The mat-forming station 6 is effective to form an air laid uncompressed mat of loose discrete particles on the cauls successively advanced beneath the mat-forming station. Apart from the fact that the mat-forming station 6 is effective to form such an uncompressed loose mat of particles of progressively coarser character and size both from the bottom face and top face of the mat toward the center thereof, the details of the mat-forming section 6 are not significant to the present invention. An understanding of the mode of operation and function of such a mat-forming station may be had by reference to U.S. Patent 3,028,287.

After the uncompressed mat is laid on the cauls 4 carried by the conveyor 1, it advances toward the left in FIGURE 1 where it becomes necessary to sever from the mat a section of predetermined length corresponding generally to the length of an individual caul 4 to be subsequently compressed to form a cured panel. The cutting means together with the tamping and consolidating means constitute a characterizing feature of the present invention which is generally indicated at 7 in FIGURE 1 as carried by a vertical frame 8 mounted on a wheeled carriage 9 for forward and rearward movement along a track 10 by a sprocket drive including the belt 11 appropriately driven from the drum 2 and to which the frame 8 on carriage 9 is connected by links, one of which is shown at 12 in FIGURE 1. As will be later described, the air laid mat 13 has succeeding sections 14 and 15 severed therefrom as the cauls 4 are continuously advanced toward the left by the conveyor 1 and when a caul carrying a severed mat section such as 14 reaches the delivery end of the conveyor 1, it is advanced onto the series of rapidly driven rollers 16, the speed of which is such as to carry each successive caul and the mat section thereon rapidly away from the delivery end of the conveyor 1 to be supplied suitably to a multiple-opening press wherein a plurality of mat sections may be compressed to form cured particle board panels.

Figure 2:
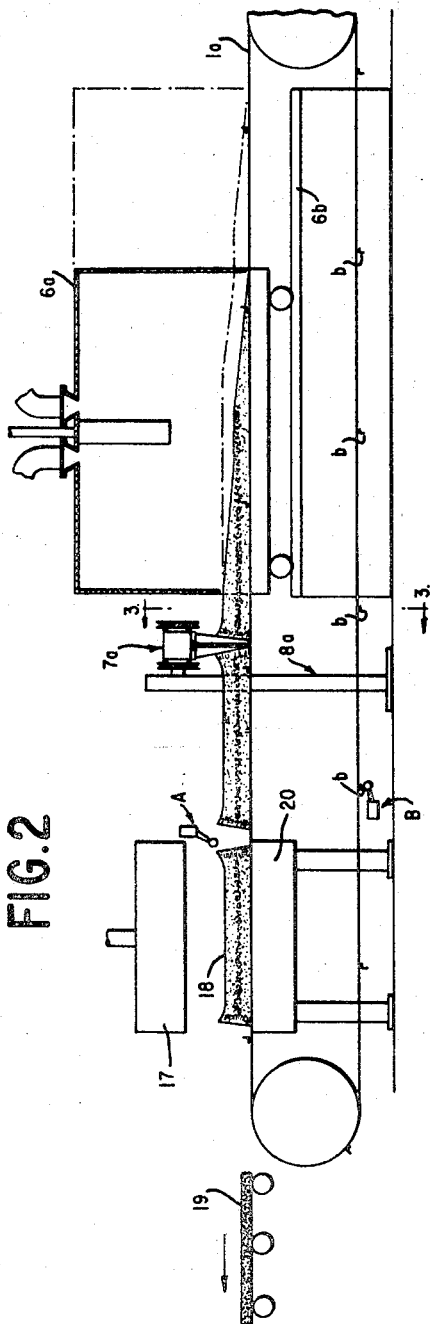
FIGURE 2 is a similar diagrammatic view in side elevation of an installation for discontinuous operation employed with a single layer press.

The discontinuous installation diagrammatically shown in FIGURE 2 differs from the continuously operating installation in FIGURE 1 primarily in that the mat-forming station 6a is mounted on a track 6b and partakes of forward and rearward movement along the conveyor 1a in a timed relationship to the opening and closing of the single layer press 17. In the FIGURE 2 installation, the use of cauls may be dispensed with and the successive mat section such as 18 and 19 compressed directly between the single opening press head 17 and the conveyor belt 1a moving over the press base 20. Likewise in the FIGURE 2 installation, the cutting means together with the tamping and consolidating means 7a may be mounted on a stationary vertical frame 8a, since the transverse severing of the mat 13 may be effected when the conveyor belt 1a is at rest and during the cycle of operation of the press 17.

There is shown in FIGURE 3 the stationary vertical frame 8a having side posts 21 and 22 interconnected by track member 23 on which is mounted the carriage for the cutting means together with the tamping and compacting means indicated generally at 7a. This carriage embraces a rectangular box-like housing 24 provided with the rollers 25 cooperating with the track 23. In the FIGURE 3 embodiment, the housing 24 is advanced along the track 23 through the medium of a driven screw 26 which passes through the internally threaded projection 27 standing above and integral with the housing 24. The screw 26 is driven by the reversible two-speed motor 28 and belt drive 29.

Inasmuch as the details of the cutting means together with the tamping and consolidating means and the actuation thereof are the same for the embodiment of FIGURE 3 as for the embodiment in FIGURE 4, they will be later described. Referring to FIGURE 4, there is disclosed an embodiment for supporting the cutting means together with the tamping and consolidating means indicated generally at 7 which is appropriate for use with the continuously operating installation of FIGURE 1. It embraces the vertical side members 30 and 31, each supported on a carriage 9 with each carriage 9 movable along its associated track 10. In this modification, the transversely extending member 32 which forms a track for the housing 24 is vertically movable through the action of the synchronously operated screws 33 actuated by synchronous motors 33a which in appropriately timed sequence raise and lower the transverse track member 32 and all of the equipment carried thereby including the housing 24, the driven sprocket 34, idler sprocket 35 carrying sprocket chain 36 interconnected to housing 24 at 37 and driven by the reversible two-speed motor 38 via the sprocket drive 39 which, as indicated, are all supported on and partake of vertical movement in unison with the transverse track member 32 on which the housing 24 is supported by its associated rollers 25. To alleviate the frictional load on the screws 33, suitable counterweights 40 are connected to the carriages 41 at opposite ends of the transverse track member 32.

In FIGURE 5 there is shown in more detail means for effecting the directional movement of the carriages 9 along their respective tracks 10 which means are complemental for each carriage 9 embracing the driven sprocket chain 11 at each end of the drum 2, with an associated link 12 having a pivotal connection 42 at one end to the sprocket 11 and a pivotal connection 43 at the opposite end to one of the vertical members 30 and 31. It will be appreciated that the arrangement is such that when the pivotal connection 42 moves about its associated sprocket at the end of the drum 2, the link 12 will be carried to the lower or return run for the sprocket drive 11.

Figure 6:
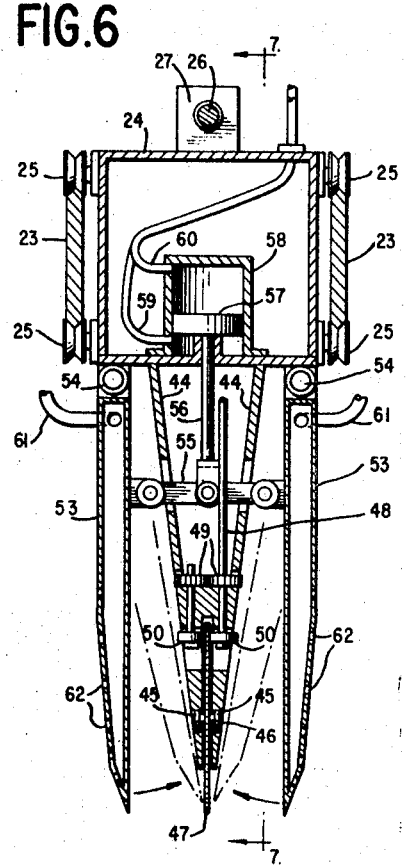
FIGURE 6 is a detail cross-sectional view at right angles to FIGURE 7 showing one form of sub-assembly carrying the cutting means together with oscillatable tamping members.
Figure 7:
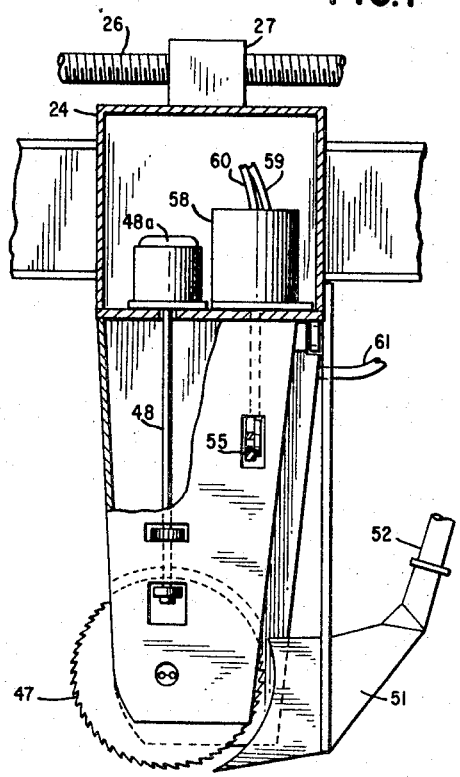
FIGURE 7 is a view in elevation with parts broken away for clarity of the sub-assembly shown in FIGURE 6.
Figure 8:
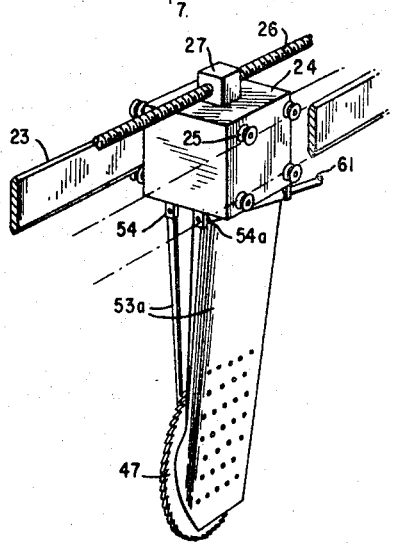
FIGURE 8 is a perspective view of a modified form of sub-assembly carrying the cutting means and the oscillatable tamping and compacting members.

Coming next to the details of the cutting means and the associated tamping and compacting means, reference is first made to FIGURES 6 and 7 in which the housing 24 carries the rollers 25 for cooperation either with the track member 23 of FIGURE 3 or the track member 32 of FIGURE 4. While the housing 24 in FIGURES 6 and 7 is shown as associating with the screw drive 26 and 27 of FIGURE 3, it will be appreciated that the housing 24 can be interconnected to the sprocket chain 36 as indicated at 37 in FIGURE 4. First with respect to the cutting means, it will be observed that there are depending complemental converging walls 44 extending downwardly from the lower wall of the housing 24. Near their lower ends the converging walls 44 provide bearings 45 for the axle 46 of the circular saw 47. A vertical shaft 48 driven by suitable motor 48a supplies power through the intermeshing gears 49 to the opposed friction wheels 50 which rotate in opposed directions and frictionally drive through contact with its opposite faces the rotary saw 47.

As will be seen in FIGURE 7, the leading edge of the saw 47 is well in advance of the depending members 44, and there is provided to the rear of the saw 47 a vacuum nozzle 51 connected through line 52 to a suitable suction device to exhaust cuttings carried by the saw.

Coming next to the tamping and consolidating means, which in the embodiment of FIGURES 6 and 7 embrace complemental hollow members 53 pivotally carried at 54 on the bottom of the housing 24. In the full line position in FIGURE 6, the hollow tamping members 53 are shown at their outward limit of movement and in the dotted line position at their inner limit of movement. The lateral movement of the hollow tamping members 53 in the FIGURES 6 and 7 embodiment is effected via the lazy-tong linkage 55, the piston rod 56, associated piston 57 moving in cylinder 58 mounted above and on the inside of the lower wall of the housing 24. Suitable two-way flow lines 59 and 60, respectively, deliver and exhaust hydraulic fluid under the necessary control of conventional valve mechanism, not shown, to effect vertical reciprocation of the piston 57 to actuate through 56 to the linkage 55 and thereby oscillate the hollow tamping members 53 about their respective pivots 54. The speed of oscillation of the hollow tamping members 53 is rapid in comparison to the rate of advance of the circular saw 47 as it progresses with the housing 24 transversely across the mat 13. In fact, the rate of oscillation of the hollow tamping members 53 may be such as to in effect impart a vibratory action to the particles forming the opposed walls of the channel being cut by the saw 47. The rapid oscillation of the tamping members 53 occurs concurrently with the cutting of the channel in the mat 13 by the saw 47. In order to further facilitate the compacting and consolidation of the particles forming the opposed walls of the channel cut by the saw 47, heat may be applied to such particles by maintaining the contacting face of each hollow tamping member 53 at a somewhat elevated temperature which may be achieved through the introduction of a heated medium through the lines 61 and, if desired, the contacting faces of the hollow tamping members 53 may be provided with suitable openings 62 through which a fluid medium such as steam, hot air or water may be forced under pressure into the opposed walls of the channel during the tamping of the particles thereof to further facilitate the compacting and consolidation of such particles. The medium ejected through the apertures 62 may, if desired, carry a supplemental adhesive into the region of the mat adjacent each opposed face of the channel formed between the severed mat section and the remaining portion of the mat on the conveyor.

Referring to FIGURES 8, 9, 10 and 11 of the drawings, there is shown a modified form of cutting means together with concurrently operated tamping and consolidating means. In this modification, the saw 47 is driven in the same manner as heretofore described with reference to FIGURES 6 and 7, however, the oscillating hollow members 53a are hinged to the lower wall of the housing 24 on angularly disposed axes 54a which converge in the direction of the leading edge of saw 47. The oscillating hollow members 53a are moved about the angularly disposed axes 54a by an eccentric 63 which engages rollers 64 carried by members 53a. The eccentric 63 is carried on shaft 65 driven by a motor 66 and is so arranged that it acts against spring 67, whereby upon rotation of the eccentric 63 hollow members 53a are oscillated about the converging axes 54a to affect tamping and consolidation of the loose particles forming the opposing walls of the channel being concurrently cut by saw 47.

In FIGURE 12 there is shown still another sub-assembly for the cutting and tamping means in which a vertical axis 68 depends from the lower wall of the housing 24 and about which the hollow oscillatable members 53b are actuated. The hollow oscillatable members 53b in this embodiment it will be observed move about a common vertical axis somewhat to the rear of the leading edge of the saw 47. The members 53b may be oscillated in the same manner that members 53a of the embodiment of FIGURES 8–11 are actuated, i.e., by an eccentric 63 cooperating with roller 64. However, in this instance, the rollers 64 may be suitably grooved to receive the camming surface of the eccentric 63 to give further support to the members 53b and remove some of the strain from the depending vertical axis 68. The portions of the leading edges 69 of members 53b are in essential alignment with vertical axis 68 so that in oscillation of members 53b they maintain close relationship to the opposite faces of the saw 47.

It will be understood that the embodiments of cutting means and concurrently operated tamping means disclosed respectively in the group of FIGURES 8–11 and in FIGURE 12 may be employed interchangeably with the embodiment of FIGURES 6 and 7 and in association with either the discontinuous installation of FIGURES 2 and 3 of the continuously operated installation of FIGURES 1 and 4.

Figures 13, 13A:
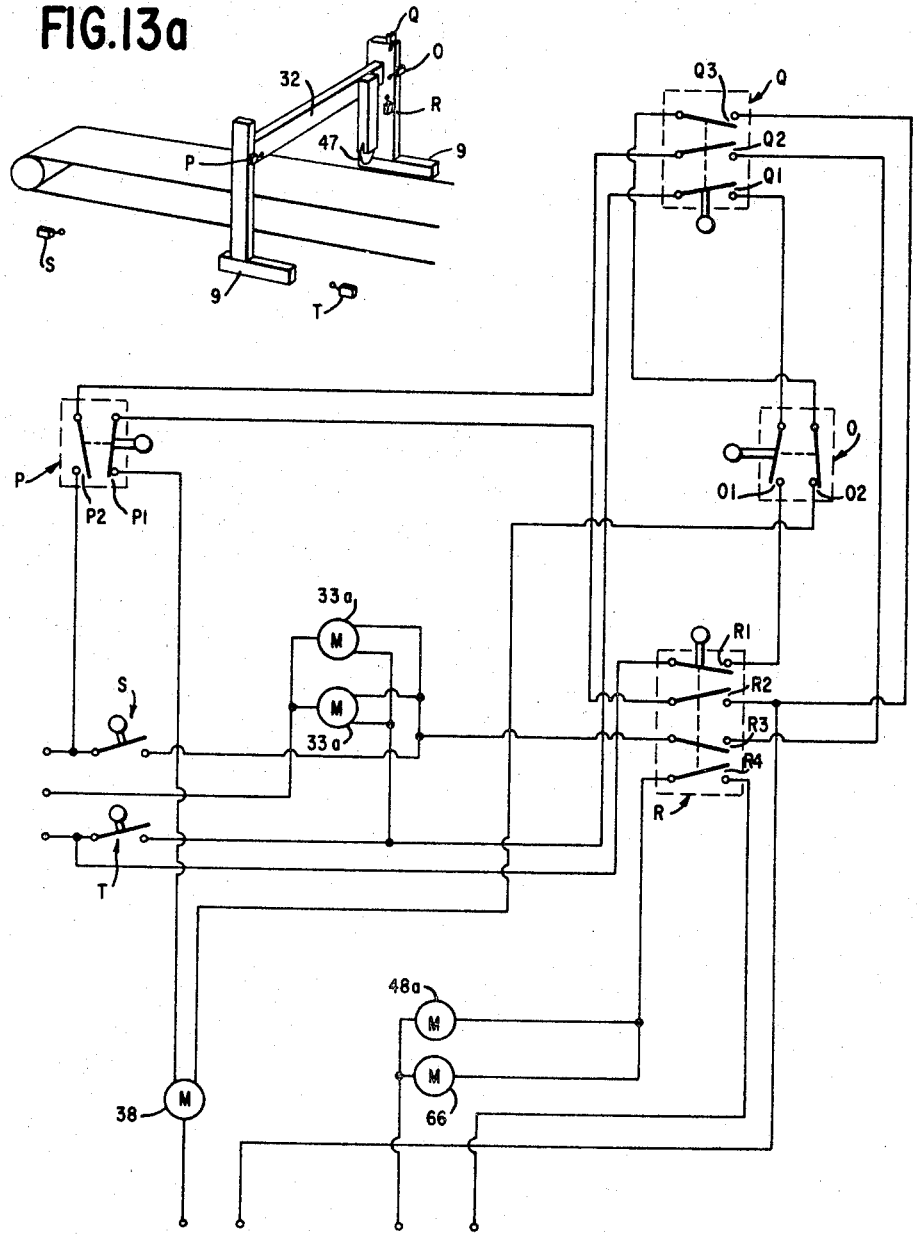
FIGURE 13 is a schematic circuit diagram exemplifying controls suitable for employment in accordance with the arrangement of the invention shown in FIGURE 4.
FIGURE 13A is a diagrammatic view of the modified construction shown in FIGURE 4, exemplifying a suitable arrangement of control switches.

The operation, germane to the present invention, of the continuous installation exemplified in FIGURES 1, 4 and 5 will be set forth with relation to the schematic control circuit of FIGURE 13.

As shown diagrammatically in FIGURE 13a, control switches are provided to secure the desired sequence of operation of saw 47 on track 32 and of track 32 supported on carriages 9. Carriages 9 oscillate along the length of track 10 on which their position is controlled by coupling 12. At the extremes of their travel the carriages' velocity is very low and its motion at this cycle of the operation is employed to close controlling switches for predetermined time periods. Thus, as the carriages move slowly to the right of the full line position shown in FIGURE 1, switch T (FIGURE 13a) is engaged. The closure of this switch is employed with associated circuitry to lower track 32 and this operation in turn starts saw 47 driven by motor 48, and also motor 66 which drives the oscillating tamping members. Additionally, motor 38 is energized to advance housing 24 transversely of mat 13 to cut a channel in the mat and tamp the opposed walls thereof.

As shown in the diagram of FIGURE 13, track 32 cooperates in its uppermost position with switch Q, which in combination with switch R controls the direction of rotation of motors 33a driving lead screws 33.

On closure of switch T, motors 33a are energized in the correct direction to lower track 32. When track 32 has moved sufficiently to operate switch Q, contacts Q1 close and continue the operation of motors 33a through series contacts O1 (closed by engagement of carriage 24 with switch O), and contact R1 (normally closed). Switch T is then opened.

When track 32 is fully lowered, it operates switch R, to open contacts R1 and stop motors 33a. Contacts R4 then start motors 48 and 66.

As switch R operates, carriages 9 are moving with the same forward speed as conveyor belt 1, so that the mat may be severed by traversing carriage 7 across track 32. This is effected by motor 38 which is energized for the desired direction through contacts by closure of R2. Movement of carriage 24 opens contacts O1, also in series with motors 33a. Operation of motor 38 continues until carriage 24 traverses the belt 1 and the associated equipment is clear of the mat. Switch P then operates to open contacts P1 and stops motor 38.

As the carriages 9 approach their extreme left position, switch S closes and starts motors 33a in a direction to raise track 32. Switch R1 then operates to close contacts R3, by-passing switch S through contacts P2 and Q2. Contacts R4 open to stop drive motors 48 and 66. The operation of motors 33a continues until the carriage reaches its uppermost position to open contacts Q2. This stops motor 38, since switch S has previously opened.

Operation of switch Q closes contacts Q3, which energizes motor 38 to retract carriage 24 to its initial position via contacts O2. Operation continues until switch O is operated by engagement with carriage 24, to open contacts O2. Thus, the mechanism and the electrical controls are again in position for a subsequent operation when carriages 9 reach their right hand position to operate switch T for a subsequent cycle.

The operation of the apparatus of FIGURE 2 will be explained in connection with the detailed exemplary circuit for operating motors 28, 48 and 66 to sever the mat shown in FIGURE 14. In FIGURE 2 a severed mat section 18 has been transferred to underlie press member 17. In this conveyor position, switch B has been operated by engaged actuator b carried by conveyor belt 1a. As the result of this engagement, switch B has terminated a stepwise limited advance of conveyor belt 1a which may be manually initiated by circuitry, not shown. At this stage of the operation press member 17 may be lowered by appropriate hydraulic controls conventional in the art. Press member 17, as it is lowered, engages the actuator shown in FIGURE 2 for switch A. Contact members of this switch, as shown in FIGURE 14, are arranged in series with switch B and manual control switch M, so that when the machinery is in the described condition, the mat severing apparatus shown in FIGURE 2 may be operated to sever the next portion lying between press 17 and saw 47 with its associated mechanism.

In the position shown at FIGURE 2, housing 24 (FIGURE 3) is in contact with switch C at the right of the latter figure. When manual control switch M (FIGURE 14) is closed by the operator, carriage drive motor 28 is energized through contacts E1 of relay E through contacts D1–D2 of switch D. Contacts E2 and E3 of relay E also immediately energize drive motors 48 and 66. Motor 28 immediately rotates screw 26 and retracts housing 24 from switch C so that contacts C1 and C2 close. Contacts C2 energize a holding circuit for the coil relay E so that manual switch M may be immediately released. Therefore, as saw 47 is driven across the mat by motor 28 and lead screw 26, the next mat section is separated for subsequent introduction into the press. This operation is completed as carriage 24, shown in FIGURE 3, reaches its left position engaging the actuator of switch D. Referring again to FIGURE 14, this opens contacts D1–D2 to terminate energization for forward drive on motor 28, and swings power contact D2 into abutment with contact D3, which leads through contacts C1 of switch C and the operating coil D4 to energize the reverse lead of drive motor 28 for carriage 24, which circuit locks in by the series arrangement of the motor and coil D4. Preferably, this will effect a high speed return of carriage 24 to its initial position. During the reverse traverse, drive motors 48 and 66 remain de-energized because contacts D5 and D6 remain open during operation of coil D4.

Figure 14:
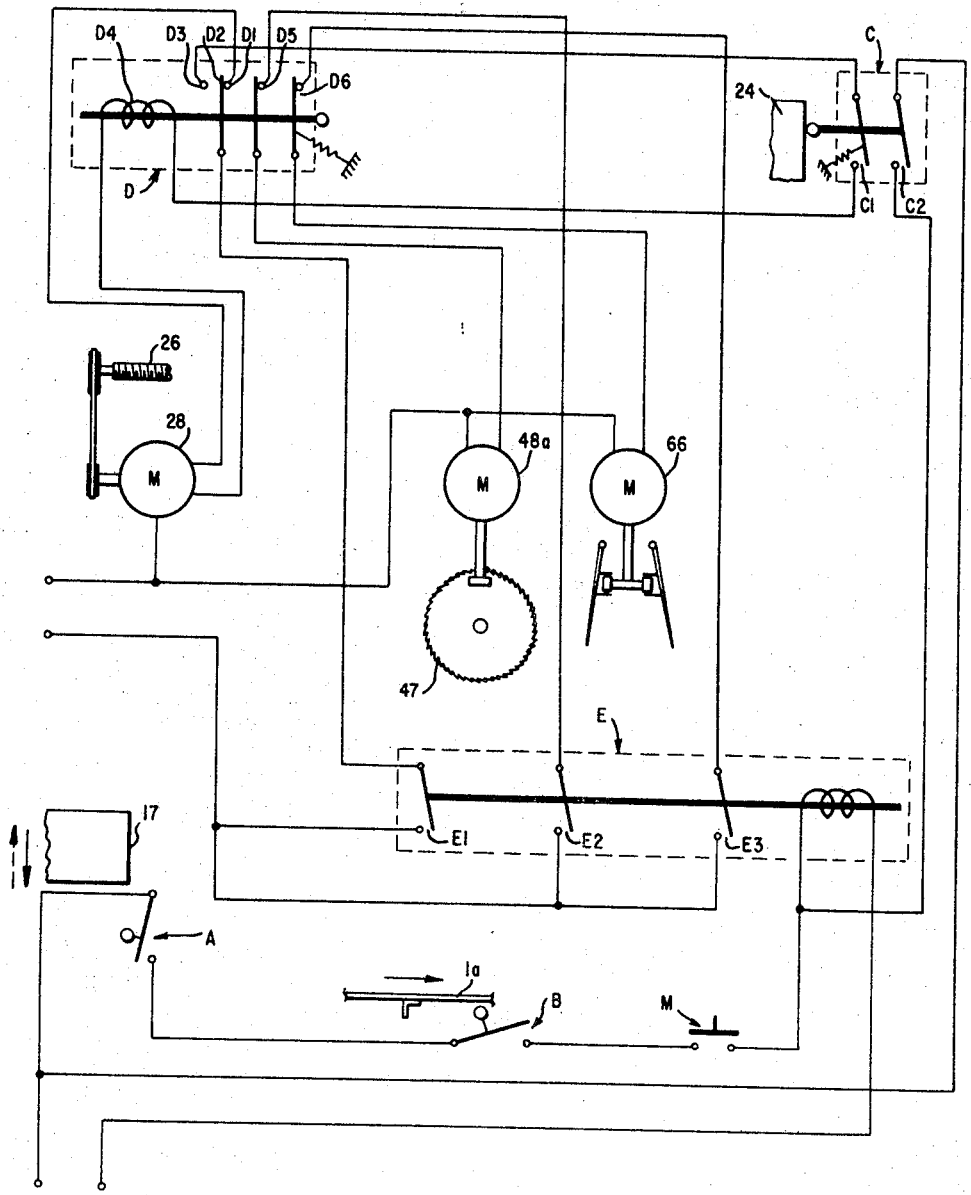
FIGURE 14 is a schematic circuit diagram exemplifying controls suitable for employment in accordance with the arrangement of the invention shown in FIGURE 3.

As carriage 24 returns to the right extreme position shown in FIGURE 14, it reopens the contacts of switch C which de-energizes relay E and coil D4. This terminates the complete operating cycle of the circuit and leaves the same ready for instant operation on the succeeding production cycle.

By suitable additional control switches, during the operation of the mechanism in severing the mat section, the mat former 6a is energized in the position shown to the left at FIGURE 2, from which it is moved at a uniform velocity to the right as shown in dotted line in that figure. During this traverse additional particle distribution is effected, terminating when chamber 6a reaches the dotted limit position. From that point, the chamber is then returned to the position shown in FIGURE 2 for the subsequent operation.

By the hydraulic circuit controls described above, press member 17 may now be elevated as shown in FIGURE 2 and conveyor belt 1a advanced to deliver the mat 18, now formed into the finished product, to the position for delivery at 19. The subsequent cycle just described advances the newly formed mat section into the press and the process above described may be repeated.

It will therefore be understood that the above described structures represent preferred and exemplary embodiments of my invention, of primary utility in carrying out my inventive method.

I claim:

1. In a method for forming particle board panels from discrete particles in which an uncompressed loose mat is first laid on a continuous movable conveyor, then severed into individual sections which sections are subsequently compressed to form cured panels, the improvement comprising cutting a narrow channel transversely of the uncompressed loose mat to sever a section of predetermined length therefrom while supported by the conveyor and concurrently with the cutting of said channel tamping the particles forming the opposed walls of said channel.

2. The method of claim 1 characterized in that the tamping is effected by subjecting the opposed walls of said channel to the action of an oscillating surface.

3. The method of claim 1 characterized in that the cutting of the channel and the tamping of the particles forming the opposed walls thereof are effected during continuous movement of the conveyor.

4. The method of claim 1 including applying heat to the opposed walls of said channel during the tamping action.

5. The method of claim 1 including introducing a fluid medium into the opposed walls of the channel during the tamping action.

6. In a machine for producing particle board panels from an uncompressed mat of substantial thickness comprised of relatively loose particles, which mat is carried on a continuous movable conveyor, said machine embracing cutting means for cutting a narrow channel transversely of the loose mat to separate a section thereof of predetermined length for subsequent compressing, and means operating concurrently with said cutting means to tamp the particles forming the opposed walls of said channel and widen the same.

7. The machine of claim 6 characterized in that the means to tamp the particles forming the opposed walls of the channel comprise a tamping member and means to effect oscillation of said tamping member against said walls concurrently with the actuation of the cutting means.

8. The machine of claim 6 characterized in that the means to tamp the particles forming the opposed walls of the channel comprise a pair of laterally oscillatable members and means to effect oscillation thereof concurrently with the actuation of the cutting means.

9. The machine of claim 6 characterized in that the cutting means and the means to tamp the particles forming the opposed walls of the channel are carried on a common support movable transversely of the mat to be severed.

10. The machine of claim 6 characterized in that a common support is provided for the cutting means and the tamping means together with means to move said common support transversely of the mat during concurrent actuation of the cutting means and the tamping means.

11. The machine of claim 6 characterized in that the machine embodies a common supporting head for said cutting means and said tamping means together with means for carrying said supporting head for to and fro movement in the direction of travel of the conveyor and for simultaneous movement transversely of the conveyor.

12. The machine of claim 6 characterized in that the means to tamp the particles forming the opposed walls of the channel comprise a member on said cutting means, said member having a surface extending substantially at right angles to the plane of said mat, and means for oscillating said surface in a path toward and away from said opposed walls, whereby said surface compacts the walls of the channel without reducing the thickness of the mat.

References Cited by the Examiner

UNITED STATES PATENTS

| 705,064 | 7/02 | Frey | 25—107 |
|---|---|---|---|
| 2,165,280 | 7/39 | Lannan | 156—36 |
| 2,538,972 | 1/51 | Magnani. | |
| 2,644,217 | 7/53 | Agar | 25—107 XR |
| 2,664,923 | 1/54 | Ferrari | 143—158 XR |
| 2,683,297 | 7/54 | Lea | 25—43 |
| 2,712,169 | 7/55 | Buttress | 25—107 XR |
| 2,923,030 | 2/60 | Himmelheber et al. | 264—118 |
| 3,057,022 | 10/62 | Bar et al. | 264—118 XR |
| 3,096,542 | 7/63 | Fischer et al. | 264—118 |

ALEXANDER H. BRODMERKEL, *Primary Examiner.*

EARL M. BERGERT, *Examiner.*